US006188139B1

(12) United States Patent
Thaxton et al.

(10) Patent No.: US 6,188,139 B1
(45) Date of Patent: Feb. 13, 2001

(54) INTEGRATED MARINE POWER DISTRIBUTION ARRANGEMENT

(75) Inventors: Edgar S. Thaxton, Bradford, RI (US); Robert M. Adair, Phippsburg, ME (US); Gene Castles, Preston; Peter M. Rinaldi, Mystic, both of CT (US)

(73) Assignee: Electric Boat Corporation, Groton, CT (US)

( * ) Notice: Under 35 U.S.C. 154(b), the term of this patent shall be extended for 0 days.

(21) Appl. No.: 09/234,263

(22) Filed: Jan. 20, 1999

(51) Int. Cl.[7] .................................. F01D 13/00; F01D 1/00
(52) U.S. Cl. ..................... 290/4 R; 290/4 A; 290/4 B; 290/4 C; 290/4 D
(58) Field of Search .................... 290/40 A–40 F

(56) References Cited

U.S. PATENT DOCUMENTS

| | | |
|---|---|---|
| 4,114,555 | 9/1978 | O'Brien, Jr. . |
| 4,645,940 | 2/1987 | Wertheim . |
| 4,709,203 | 11/1987 | Roux et al. . |
| 4,927,329 | 5/1990 | Kliman et al. . |
| 4,967,097 | 10/1990 | Mehl . |
| 5,038,265 | 8/1991 | Paladel . |
| 5,109,185 | * 4/1992 | Ball ...................................... 323/207 |
| 5,194,757 | 3/1993 | Wertheim . |
| 5,199,912 | 4/1993 | Dade et al. . |
| 5,222,901 | * 6/1993 | Burkenpas .............................. 440/86 |
| 5,301,096 | * 4/1994 | Klontz et al. ........................... 363/37 |
| 5,373,433 | * 12/1994 | Thomas ................................... 363/43 |
| 5,519,275 | * 5/1996 | Scott et al. ............................. 310/112 |
| 5,684,690 | 11/1997 | Levedahl . |

* cited by examiner

*Primary Examiner*—Elvin Enad
(74) *Attorney, Agent, or Firm*—BakerBotts, L.L.P.

(57) ABSTRACT

A marine power distribution arrangement includes a turbine-driven AC generator which supplies AC power at a frequency of 240 Hz through a switchgear unit to a transformer and a first power converter by which the power is converted to a variable frequency, variable voltage AC output for ship propulsion and to a second power converter by which the AC power is converted to a fixed voltage, fixed AC frequency or DC power to supply the ship service loads. A battery backup power supply may be switched in an emergency. In another embodiment four turbine-driven AC generators and two emergency power supplies are provided to drive two propulsion shafts as well as to supply the ship service loads.

18 Claims, 3 Drawing Sheets

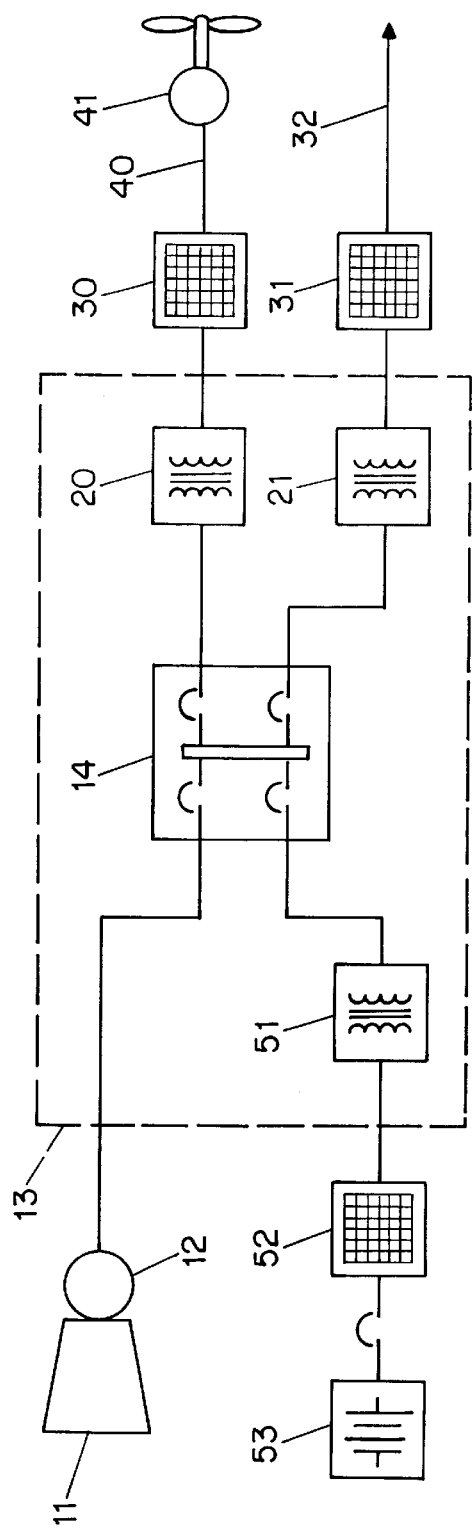
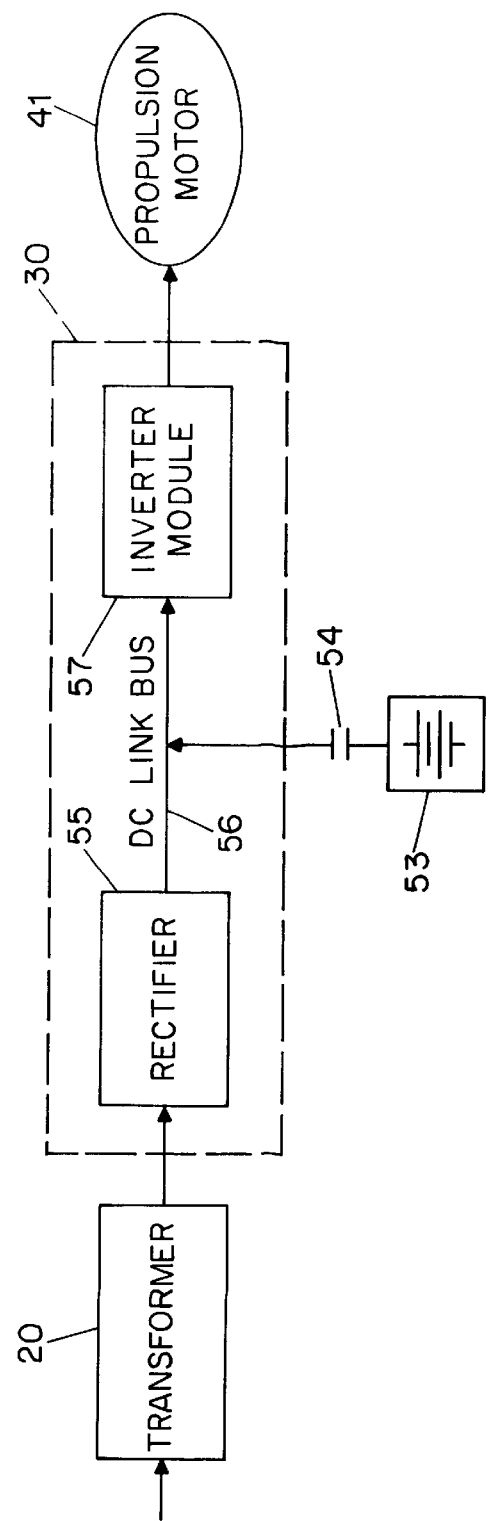
FIG. 1
FIG. 2

INTEGRATED MARINE POWER DISTRIBUTION ARRANGEMENT

BACKGROUND OF INVENTION

This invention relates to integrated marine power distribution arrangements and, more particularly, to such arrangements that provide electric power at frequencies higher than the usual 60 Hz.

Conventional integrated marine electric drive systems generate AC power at 60 Hz and either utilize the AC power directly at 60 Hz, through frequency converters for the ship's propulsion motors and transformers for the ship's auxiliary power circuits, or rectify the AC power from the generator and distribute direct current (DC) power and then convert the DC power to AC power using conversion equipment for the ship's propulsion motors and also for the ship's auxiliary power circuits.

The Satterthwaite et al. U.S. Pat. No. 4,661,714 discloses an integrated marine propulsion system that produces AC power at a frequency two to three times the standard low voltage, 480 VAC, 60 Hz frequency, i.e., up to 180 Hz. The outputs of the AC power generators are supplied through a ship service switchboard to a series of frequency converters that supply the propulsion motors for the ship at frequencies that vary from 0 to 60 Hz. In addition, the switchboard supplies the higher frequency power to a transformer and frequency converter that produce the ship's service utility and auxiliary power at standard 60 Hz frequency.

The Levedahl U.S. Pat. No. 5,684,690 discloses an integrated electrical power supply system for propulsion and service power in a ship in which two alternators, a propulsion alternator and a separate service alternator, are powered from the same turbine or engine. The frequency of the power generation is not disclosed. In this arrangement, the use of added multiple generators in parallel is not practical.

The Dade et al. U.S. Pat. No. 5,199,192 discloses an electric power system for marine vehicles in which one or more AC generators supply both ship's propulsion and ship's service auxiliaries. The output from the generators is rectified to a DC voltage for distribution and reconverted to AC for the propulsion motors and also for ship service. There is no provision for an integrated electric plant whereby multiple generators are paralleled for maximum efficiency.

In the prior art, integrated electric plants with limitations of frequency, voltage, and generator arrangements are presented. Such integrated electric power systems have certain disadvantages with respect to size and weight that have not been heretofore addressed.

SUMMARY OF THE INVENTION

Accordingly, it is an object of the present invention to provide an integrated electric propulsion and distribution arrangement providing maximum power density that overcomes disadvantages of the prior art.

Another object of the invention is to provide an integrated electric propulsion and power distribution arrangement producing optimum engine/turbine prime mover speed that provides the highest power density and uses the lowest weight engine.

A further object of the invention is to provide an integrated power distribution system having a generator with the optimum generator pole pair configuration that produces the highest power density and uses the lowest weight generator.

An additional object of the invention is to provide an integrated high power distribution arrangement for converting power from low voltage (450 VAC) to a medium voltage (15 kV) level, at frequencies greater than 60 Hz.

Another object of the invention is to provide a power distribution arrangement having transformer isolation and low system harmonics while maintaining a high power density.

A further object of the invention is to provide a power distribution arrangement utilizing the same multiple power modular power conversion equipment for the ship propulsion motor and the ship service power conversion equipment.

These and other objects of the invention are attained by providing an integrated power distribution supply utilizing prime movers and generators operating at higher speed and/or having a higher number of poles to produce power at higher distribution frequencies.

In accordance with the invention, a prime mover may be any higher speed gas or steam turbine, or diesel engine. Typically, a steam turbine operating at 7,500 RPM will provide a weight savings of approximately 50% over one operating at 3,600 RPM which produces the same power. In addition, generator weights can be reduced as the number of generator poles and the generator operating speed is increased. As an example, where generator speed is increased from 3,600 RPM to 7,500 RPM and the number of generator poles is increased from 2 to 4, a weight saving of approximately 50% can be obtained. An 1,800 RPM, 4 pole, 60 Hz generator typically weighs 72,500 lbs. which is excessive when compared to a 7,000 RPM, 4 pole, 233 Hz generator at the same power rating which weighs approximately 34,000 lbs. and has more than twice the power density. This increased power density and corresponding weight reduction allows the prime mover and generator to be located higher in the ship without adversely affecting ship stability. The corresponding decrease in the length and size of intake and exhaust ducts for gas turbine and diesel engine applications further reduces the weight and volume of the arrangement.

To accomplish such an increase in power density, the generator is driven by the prime mover at a speed to produce its rated voltage but at frequencies above 60 Hz and up to 400 Hz. The generator voltage can be any standard marine distribution voltage from low voltage (450 VAC) to medium voltage (15 kV). In addition, the higher system frequencies (>60 Hz to 400 Hz) enables further weight savings in other components and enhanced system performance.

For ship propulsion, the higher than 60 Hz distribution frequency is converted to the required ship propulsion motor frequency using conventional frequency conversion equipment. The propulsion motor may thus be coupled directly to a propeller shaft having a fixed pitch propeller.

For ship service power, the higher than 60 Hz distribution frequency is converted to the required service distribution system frequency using conventional frequency conversion equipment The ship service system can be arranged to supply DC power, standard 60 Hz AC power or AC power at any variable voltage and frequency.

The higher distribution frequency of the arrangement according to the invention allows the power conversion equipment connected to the main distribution bus to utilize a power-dense design. Transformer size and weight are minimized with higher frequencies allowing a smaller core design. In addition the power conversion equipment based on pulse width modulation PWM technology at higher modulation frequencies can reduce filtering.

BRIEF DESCRIPTION OF THE DRAWINGS

Further objects and advantages of the invention will be apparent from a reading of the following description in conjunction with the accompanying drawings, in which:

FIG. 1 is a schematic block diagram showing a representative embodiment of an integrated power distribution arrangement according to the invention and having a single engine;

FIG. 2 is a schematic block diagram of an arrangement for an emergency battery alternate power supply applied directly to the power conversion equipment;

DESCRIPTION OF PREFERRED EMBODIMENTS

Figure 3:
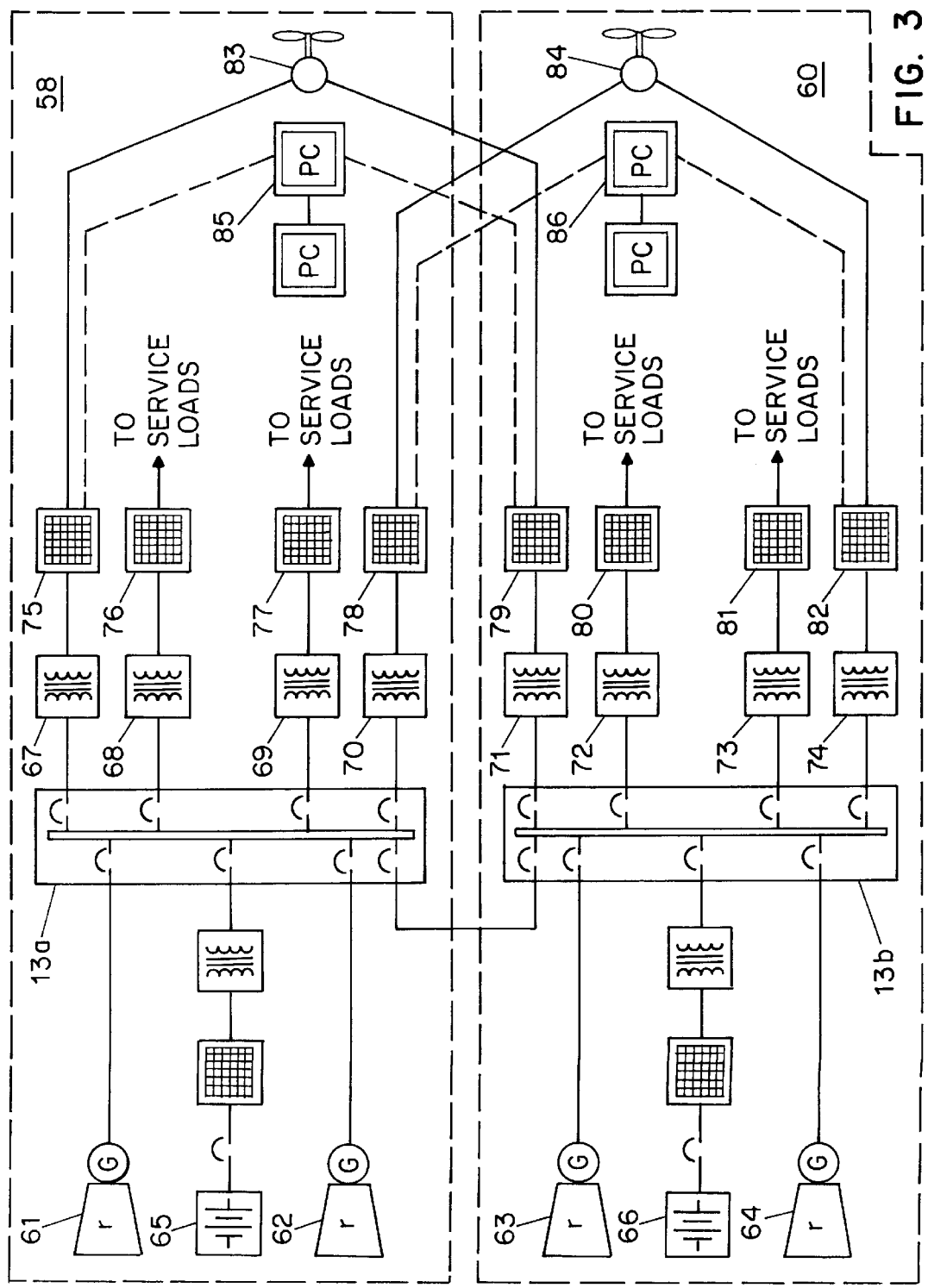
FIG. 3 is a schematic block diagram showing a typical power distribution arrangement for multiple engines and shafts in dual engine rooms.

In the representative embodiment of the invention illustrated in FIG. 1, a single prime mover in the form of a turbine 11 is directly coupled to drive a generator 12 to produce AC power at a high frequency of, for example, 240 Hz and supply it to a distribution system 13 through switchgear 14. The particular prime mover 11 is selected according to the required drive speed of the generator 12, which is provided with the required number of pole pairs to generate an output at a high frequency of for example 240 Hz to provide the most power dense engine and generator package.

For a comparison of power densities, a GE marine 13.7 megawatt gas turbine-generator set package consists of a 7,000 RPM gas turbine which is reduction-geared to a standard 60 Hz, 15 MVA 1,800 RPM commercial generator. The total weight of the standard generator set package is 124,525 lbs. In a preferred embodiment of the invention, an LM1600 7,000 RPM gas turbine is directly connected to a Westinghouse 13.8 kV, 14.5 MVA, 7,000 RPM, 4 pole generator which produces an output voltage at a frequency of 233 Hz. The total weight of this optimized LM1600 generator set package is approximately 78,025 lbs., thus providing a weight saving of 46,500 lbs., or 37%, over the standard 60 Hz marine generator set package.

This weight saving is offset in part by the requirement for power conversion equipment used for ship service loads. However, the added weight of a 240 Hz-to-60 Hz power conversion stage for that purpose is minimized by the use of the higher distribution frequency and the corresponding reduction in transformer weight as shown in Table 1 below.

TABLE 1

Typical Transformer Power Densities

| Rating kVA | Voltage Class | Frequency Hz | Volume in$^3$ | Weight lbs | Cooling | Power Density (kVA/lb) | Power Density (kVA/in$^3$) |
|---|---|---|---|---|---|---|---|
| 500 | 15 kV | 60 | 93,312 | 3,900 | Forced water | 0.128 | 0.0054 |
| 500 | 15 kV | 240 | 43,904 | 1,380 | Forced water | 0.362 | 0.0114 |
| 3,000 | 15 kV | 60 | 429,312 | 13,140 | Open Air | 0.228 | 0.0070 |
| 3,000 | 15 kV | 240 | 210,600 | 9,800 | Open Air | 0.306 | 0.0142 |

In addition, even with a 60 Hz distribution system, the generator output and main distribution voltage is normally much higher than the ship service voltage, which requires transformers to reduce it to the lower ship service voltages.

Moreover, a 60 Hz system generally has an increased power conversion equipment weight in comparison with a higher frequency system because of the increased filtering weight.

The high frequency output from the generator 12 is distributed through the distribution system 13 having integrated medium frequency 240 Hz and medium voltage vacuum interrupter circuit breakers such as those provided by SPD Technologies. The distribution system 13 is designed to be limited in size and complexity for ease of cabling and to provide electrical protection in a marine environment.

The primary loads connected to the main distribution bus in the system 13 are two modular medium frequency water-cooled transformers 20 and 21 having a phase shifting configuration to provide phase multiplication for reduced system harmonics. Table 1 above shows the potential weight saving resulting from the increased frequency and water cooling of the transformers. The transformer 20 supplies multiple phases to modular pulse width modulated (PWM) multi-level, multi-circuit power conversion equipment 30 for ship propulsion and the transformer 21 supplies power to the same type of modular, PWM multi-level, multi-circuit power conversion equipment 31 which provides ship service power on a line 32. The equipment 31 is configured for the required type of ship service power, which may be DC, fixed voltage multi-phase 60Hz AC or any other conventional ship service power.

The propulsion motor power conversion equipment 30, which is a variable voltage and frequency PWM modular unit, is configured to provide output power on a line 40 to an AC propulsion motor 41 at optimum voltage and phase number to match the propulsion motor. The equipment 30 has low voltage, low power, modules configured in series to produce high voltage and in parallel and with multiple phases to provide increased power. The ship propulsion motor 41 may be an induction, wound-field synchronous, or permanent magnet (PM) motor. The preferred embodiment uses a PM motor since a wound-field synchronous motor and its support auxiliaries can weigh over 50% more than comparable PM motors.

The drive voltage supplied to the motor 41 is proportional to the required rotor speed and the air gap flux density. The input frequency from the motor drive and the number of poles in the motor control the motor speed. When a variable frequency drive is used to power the motor 41, the motor speed is proportional to the applied frequency. Based on a fixed motor winding resistance, the current loading to produce a given power level in the motor is a function of the applied voltage.

An emergency DC backup power supply is provided by an on-board battery system 53. The battery system supplies power to the power distribution system 13 through a bidirectional static power converter 52 and a transformer 51. The transformer may be eliminated if the selected system voltage is within the capabilities of the bidirectional static power converter. The availability of emergency power permits the operation of a single generator at low power demand because it prevents a complete loss of all electrical power during a single generator failure. As power demand is increased, additional installed generators can be started and brought on-line.

An alternate arrangement for providing emergency power is shown in FIG. 2. In this case, the transformer 20 of FIG. 1 supplies power to the power conversion equipment 30. The power conversion equipment 30 contains a rectifier 55 that applies power to a DC link bus 56 to the inverter module 57.

The output of the power conversion equipment 30 provides power to the propulsion motor 41. The standby battery 53 may be connected through a switch 54 to the DC link bus 56 in the power converter 30 between the rectifier 55 and the inverter 57. The standby battery is not normally connected to the DC link bus 56 but is automatically connected when required. The battery 53 is maintained by its own charging system. This arrangement does not require the additional static power converter 52 and transformer 51 of the arrangement shown in FIG. 1. Alternatively, the DC power could be provided from other sources such as a fuel cell or a flywheel system.

FIG. 3 illustrates the application of a basic power supply of the type shown in FIG. 1 to a complete marine integrated electric propulsion system with multiple drive shafts and engine room configurations. The illustrated example of a multiple shaft configuration has two engine rooms 58 and 60 containing four LM 1600 generator sets 61–64, two in each engine room, which are capable of supplying 30,000 SHP per shaft and an additional 12 kVA for ship service and auxiliary loads. This embodiment utilizes two coupled high frequency distribution systems 13a and 13b in the engine rooms 58 and 60, respectively, to distribute power from the turbine generator sets 61–64, or from two back up battery units 65 and 66, one in each engine room, to eight transformers 67–74 and eight corresponding power converters 75–82. The power converters 75 and 79 supply power to a first propulsion motor 83 and the power converters 78 and 82 supply power to a second propulsion motor 84 while the power converters 76, 77, 80 and 81 supply the ship service loads. Dual redundant propulsion motor controls 85 and 86 permit shifting of the loads in the event that one of the turbine generators is out of service. For those skilled in the art, it is apparent that the number of on-line turbine generator sets can be increased or decreased as required to meet the propulsion and service power requirements and redundancy needs for a given application.

Figure 4:
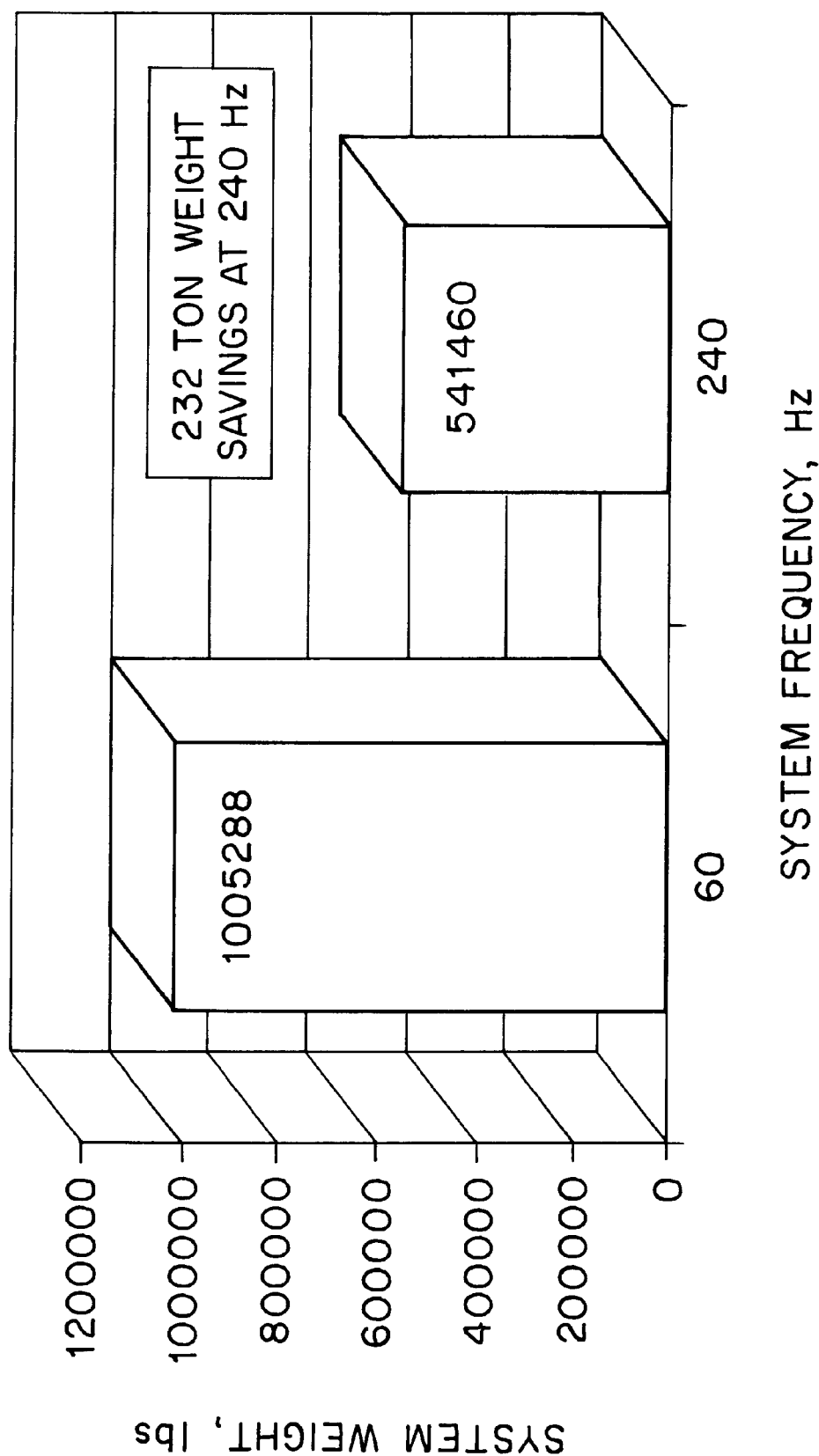
FIG. 4 is a graphical illustration providing a comparison of typical major system equipment weights based on 60 Hz and 240 Hz AC power distribution arrangements.

Typical 60 Hz power distribution transformers weigh from 10,000 lbs. to 50,000 lbs. to produce power at 2.5 MVA to 12 MVA, respectively. In the following comparison, it is assumed that the ship service system will require 12 MVA of auxiliary and service loads. For a 60 Hz system of the general type shown in FIG. 3 four 3,000 kVA transformers would be required to supply service loads with a total weight of 51,560 lbs. For the preferred embodiment 240 Hz system shown in FIG. 3, four converters are used to supply service loads. The total weight of the 12 MVA of 240 Hz ship service power conversion equipment is estimated at 45,872 lbs. The two 30 k SHP AC propulsion motors are supplied by four 12 MW power converters that have a total estimated weight of 183,488 lbs. FIG. 4 is a graph showing a comparison of system weights between the 60 Hz system and 240 Hz system in the example of FIG. 3. Without accounting for motor weights, the 240 Hz system turbine generator set and power conversion equipment total system weight is 541,460 lbs. compared to 1,005,288 lbs. for the 60 Hz system, providing a 232 ton reduction.

Although the invention has been described herein with reference to specific embodiments, many modifications and variations therein will readily occur to those skilled in the art. Accordingly, all such variations and modifications are included within the intended scope of the invention.

We claim:

1. A marine power distribution arrangement comprising:
 a prime mover for providing rotational shaft horsepower;
 an AC generator connected directly to the prime mover and designed to operate at the prime mover rated speed to generate voltage at an operating frequency higher than 60 Hz;
 a propulsion modular PWM multi-level, multi-circuit power converter connected to receive power from the generator and to provide variable voltage and frequency power;
 an AC propulsion motor connected to receive variable voltage and frequency power from the propulsion modular power converter, the AC propulsion motor having a shaft connected directly to a propulsor shaft so that the propulsor shaft RPM is controlled by the power converter output voltage and frequency; and
 a ship service modular PWM multi-level, multi-circuit power converter connected to receive power from the AC generator and providing power at a fixed voltage and frequency to a ship service power distribution system.

2. The marine power distribution arrangement of claim 1 wherein the prime mover comprises a gas turbine operated at a speed providing greater operating efficiency than other operating speeds.

3. The marine power distribution arrangement of claim 1 wherein the prime mover comprises a diesel engine operated at a speed providing greater operating efficiency than other operating speeds and wherein the AC generator has a number of pole pairs which is sufficient to provide maximum power density at the operating frequency of the generator.

4. The marine power distribution arrangement of claim 1 wherein the ship service modular power converter supplies DC power to the ship service distribution system.

5. The marine power distribution arrangement of claim 1 including a plurality of ship service modular power converters for providing ship service power having different voltage and frequency from the propulsion modular power converter.

6. The marine power distribution arrangement of claim 1 wherein the propulsion and ship service modular power converters each receive power from corresponding modular transformers having multiple isolated secondaries and having inputs connected to receive the AC generator power.

7. The marine power distribution arrangement of claim 6 wherein the modular transformers utilize multi-phase-shifted secondaries to provide harmonic cancellation.

8. The marine power distribution arrangement of claim 1 further comprising switchgear for coupling power sources to loads, an emergency DC power source connected to supply power to a bidirectional power converter for converting the DC power to AC power and supplying AC power to the switchgear for emergency propulsion and emergency ship service power.

9. The marine power distribution arrangement of claim 8 further comprising a step-up transformer having an input connected to the bidirectional power converter and an output connected to the switchgear.

10. The marine power distribution arrangement of claim 1 further comprising an emergency DC power source connected directly to a DC link-bus of the modular power converters to provide emergency propulsion and emergency ship service power.

11. The marine power distribution arrangement of claim 1 further comprising switchgear for coupling power sources to loads and an emergency AC power source connected to the switchgear and arranged to generate AC power compatible with the AC generator.

12. A marine power distribution arrangement for driving a plurality of ship propulsion shafts comprising:
 a plurality of prime movers connected to drive a corresponding plurality of AC generators, the generators being arranged to be connected in parallel as required to provide driving power to drive motors for a plurality of propulsion shafts;

the total power ratings of the AC generators being equal to the required total propulsion shaft power plus the power required for ship service and auxiliary loads;

the prime movers and corresponding AC generators being operated at increased speed or having an increased number of poles to produce a maximum power density at an operating frequency greater than 60 Hz;

a plurality of propulsion modular PWM multi-level, multi-circuit power converters connected to receive power from the AC generators and providing variable voltage and frequency power;

a plurality of AC propulsion motors connected to receive variable voltage and frequency power from the propulsion modular power converters;

a plurality of propulsion shafts connected to the AC propulsion motors so that the propulsion shaft RPM is controlled by the power converter output voltage and frequency; and a plurality of ship service modular PWM multi-level, multi-circuit power converters connected to receive power from the AC generators and to supply power to a ship service power distribution system at a voltage or frequency different from that of the propulsion modular power converters.

13. The marine power distribution arrangement of claim 12 wherein each of the modular power converters receives power from a modular transformer having multiple isolated secondaries and having an input connected to receive power from an AC generator.

14. The marine power distribution arrangement of claim 13 wherein the modular transformers have multiple-phase-shifted secondaries to provide harmonic cancellation.

15. The marine power distribution arrangement of claim 12 further comprising switchgear for coupling power sources to loads, a plurality of emergency DC power sources connected to supply power to bidirectional power converters for connecting the DC power to the AC power which can be connected to the switchgear for emergency propulsion power and emergency ship service power.

16. The marine power distribution arrangement of claim 15 further comprising a step-up transformer having an input connected to a bidirectional power converter and an output connected to the switchgear.

17. The marine power distribution arrangement of claim 12 further comprising a plurality of emergency DC power sources connected directly to a DC link-bus in a modular power converters to provide emergency propulsion and emergency ship service power.

18. The marine power distribution arrangement of claim 12 further comprising switchgear for coupling power sources to loads and a plurality of emergency AC power sources connected to the switchgear for generating AC power compatible with the AC generators.

* * * * *

UNITED STATES PATENT AND TRADEMARK OFFICE
CERTIFICATE OF CORRECTION

PATENT NO. : 6,188,139 B1　　　　　　　　　　　　　　　　　　　Page 1 of 1
DATED : February 13, 2001
INVENTOR(S) : Thaxton et al.

It is certified that error appears in the above-identified patent and that said Letters Patent is hereby corrected as shown below:

<u>Column 8,</u>
Line 21, "in a" should read -- of -- the --

<u>Column 5,</u>
Line 5, "inverter 57." should read -- inverter module 57. --
Line 18, "SHP" should read -- shp --
Line 46, "SHP" should read -- shp --

Signed and Sealed this

Nineteenth Day of March, 2002

Attest:

JAMES E. ROGAN
*Attesting Officer*　　　　　*Director of the United States Patent and Trademark Office*